Sept. 16, 1958  W. T. DOWNING ET AL  2,852,037
DIESEL EXHAUST CHECK VALVE
Original Filed March 20, 1952  2 Sheets—Sheet 1

INVENTOR.
Willis T. Downing
BY Harold Browning

ATTORNEY

Sept. 16, 1958  W. T. DOWNING ET AL  2,852,037
DIESEL EXHAUST CHECK VALVE
Original Filed March 20, 1952  2 Sheets-Sheet 2

INVENTOR.
Willis T. Downing
BY Harold Browning
ATTORNEY

United States Patent Office 2,852,037
Patented Sept. 16, 1958

2,852,037

DIESEL EXHAUST CHECK VALVE

Willis T. Downing, Alexandria, Va., and Harold Browning, Hyattsville, Md.

Continuation of application Serial No. 277,708, March 20, 1952. This application June 21, 1956, Serial No. 593,001

5 Claims. (Cl. 137—467)

(Granted under Title 35, U. S. Code (1952), sec. 266)

The invention described herein may be manufactured and used by or for the Government of the United States of America for governmental purposes without the payment of any royalties thereon or therefor.

This application is a continuation of application Serial No. 277,708, filed March 20, 1952, now abandoned, which is a continuation-in-part of applicants' prior application, Serial No. 99,822, filed June 17, 1949, now abandoned, entitled Diesel Exhaust Check Calve.

This invention relates to check valves with particular application to check valves for marine diesel engine exhaust connections.

In ships, ship engines and engine rooms under storm conditions are frequently flooded because of back flow of water through exhaust pipe connections of the engines. One scheme proposed to overcome this difficulty is to form a branch exhaust pipe connection from the main exhaust pipe to the ship bilges, but this expedient is not wholly satisfactory since in heavy seas more water may enter than the branch drain can handle; and if the bilge flow is heavy to pump capacity may be exceeded. The exhaust system is particularly susceptible to flooding in small ships having the exhaust lines from two or more diesel engines leading to a single outlet manifold. During operation of an engine, the pressure created in the engine exhaust line from the flow of exhaust gases therethrough is generally sufficient to preclude flooding of the engine but nevertheless engines and engine rooms may be flooded on occasion.

According to applicants' invention, control of water back-flow is secured by use of a check valve so constructed as to permit free exhaust of the engine gases but to completely prevent ingress of sea water when the engine is not in use. Supplementary to protection from water back-flow, means are provided for protecting the movable parts of the valve from the highly corrosive action of wet diesel exhaust gas.

The objects of the invention therefore include the provision of means for preventing back-flow of water into the exhaust of a marine engine, for forming a dead gas space adjacent the rotatable valve parts of a diesel exhaust, for securing balanced pivoting of the valve, for obtaining lubrication along the entire pivot pin surface on both sides of a blank pin area from a single source of lubricant, for facilitating grinding of the valve seat, for preventing chattering, for permitting opening of the closed valve in case of accidental starting of the engine, and for locking the valve in any desired degree of closure.

It is also an object of the invention to provide a valve of a type described made up mostly of parts that can be readily made from stock material such as plate and tubes that are commonly available in many places.

It is another object to provide a valve of a type described that is simple in design and readily fabricated at low cost.

Further objects will appear on consideration of the following description and the accompanying drawing in which.

Figure 1:
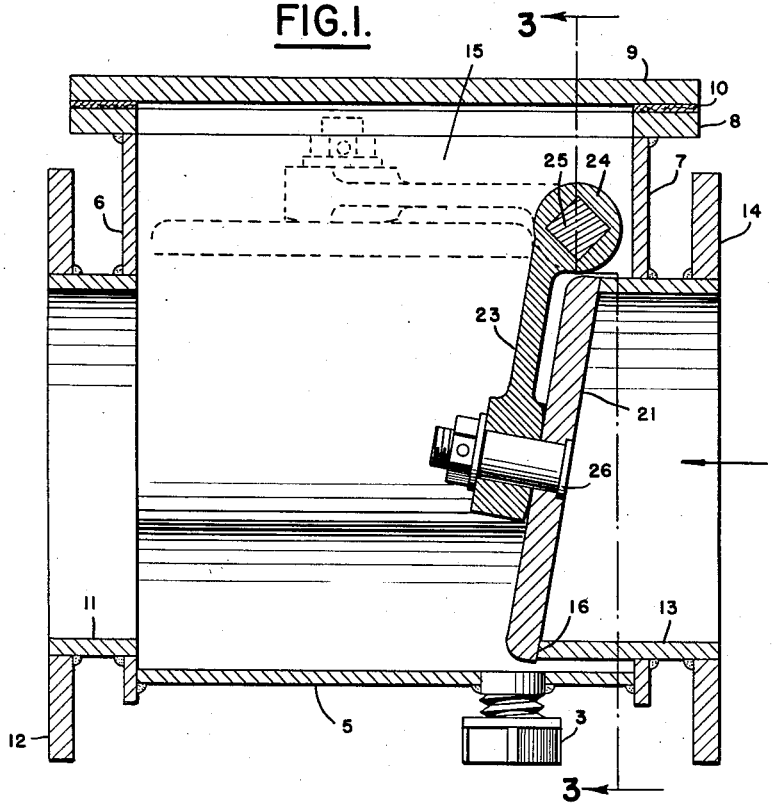
Fig. 1 is a sectional elevation of the valve structure showing attachment means for the inlet and outlet connections.

The valve casing includes a U-shaped main plate 5, front and rear end plates 6 and 7, respectively, attached as by welding to the side edges of the main plate, a rectangular top edge frame 8 formed of material such as plate forms of a narrow edging or flanges on the top edges of the main plate 5 and end plates 6 and 7, and a cover plate 9 attached to the top edge flange or plate 8 by any suitable means such as bolt and nut means. A gasket 10 provides a tight seal between the top and cover plates 8 and 9. Front plate 6 is apertured to receive a valve-outlet connector or duct 11, and a connecting flange 12 is attached to the outer front edge thereof. Similarly rear plate 7 is apertured to receive the valve-inlet connector or duct 13 of the exhaust pipe 4 from the engine exhaust or exhaust manifold. This section also is supplied with an attachment flange 14 attached to the outer edge of connector 13. A cleaner plug 3 is provided for draining condensate and sea water and liquid-carried particulate matter from the valve casing prior to opening of the valve and subsequent starting of the engine. It is evident that the legs of the U-shaped plate 5 provide a pair of sides; and the end plates 6 and 7 provide the other pair of sides for the valve body or chamber, the bottom of which is provided by the bottom or bend in the U-shaped plate 5.

It is pointed out that both the front and rear connectors 11 and 13, and the corresponding apertures in the plates 6 and 7, are offset downwardly from the chamber center so that a substantial space 15 is formed beneath the cover plate 9 and above the direct line of flow of gases, or fluid-passage, between the connectors 11 and 13. The inner or front end or edge 16 of the connector 13 is extended into the valve chamber formed by the plates 5, 6, 7, 8, and 9 so as to facilitate edge grinding of the connector 13 to provide a flat seat for valve fit. Also this edge or seat 16 is at a bias or incline to the transverse section so as to utilize the gravity clsure effect of the valve plate and prevent chatter.

It is evident that the valve chamber is simply fabricated from any suitable plate material which can be used for the plates 5, 6, 7, 8, and 9. About the only other operations required on the plates, other than cutting to size, shaping and welding, are those to provide holes in the end plates 6 and 7 for the connectors or ducts 11 and 13, a hole for plug 3, holes for the bolts to fasten the cover 9 to the flange 8, and holes in the sides or legs of U-shaped plate 5 for bearing-tubes as later described.

The inclined seat of connector or valve-inlet duct 13 receives a valve plate 21 which is mounted on a pivot pin or shaft 22 placed directly above the upper edge of the inlet connector 13 and consists of a circular plate of such diameter as to overlie and cover the connector edge 16 when suspended in closed position. A suspension arm 23 is provided with an edge tube 24 of square inner section adapted to fit over and be permanently attached to the squared section 25 of the pivot pin 22. The outer end of arm 23 is enlarged and transversely apertured to receive an attachment bolt 26 passing through the center of the valve plate 21, whereby the arm head and the valve plate are fixedly but removably united.

Figure 3:
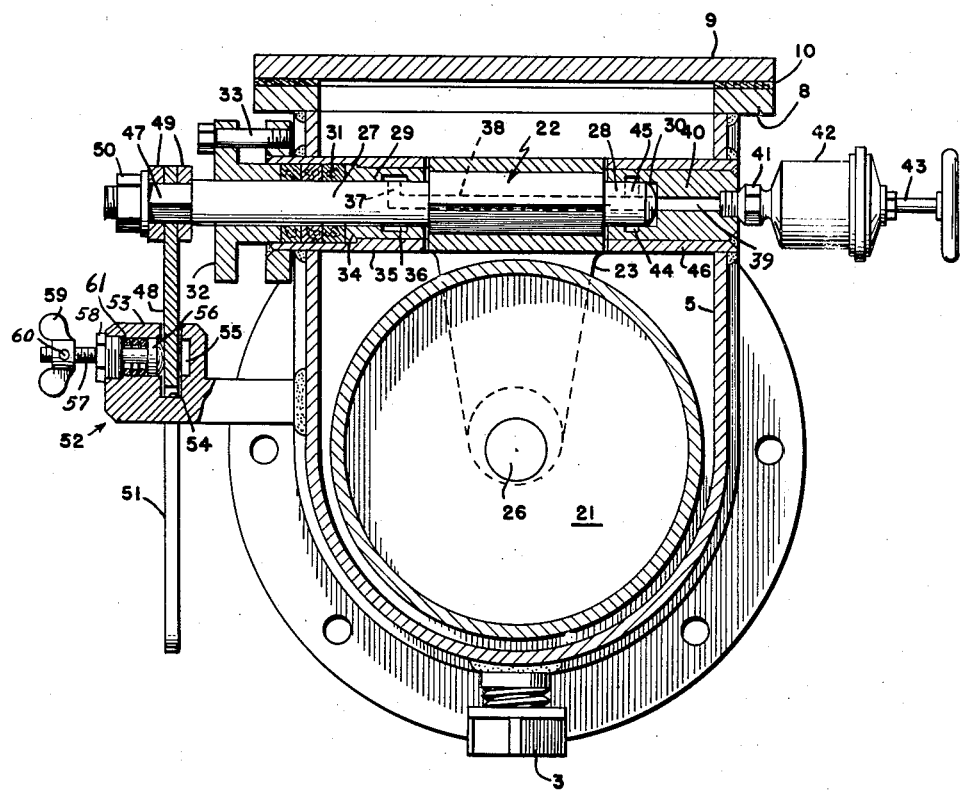
Fig. 3 is a vertical section along lines 3—3 of Fig. 1 showing the valve pin support and the lubricating means.
Figure 4:
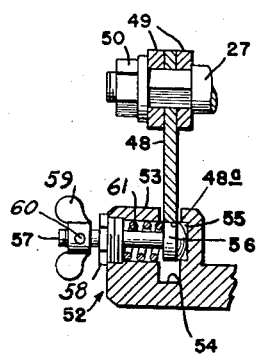
Fig. 4 is a detail of the valve locking mechanism.

The pivot pin 22 is formed of several sections including the central squared section 25 and cylindrical end sections 27 and 28. The sections 27 and 28 are pivotally mounted respectively in stuffing box bushing 29 and bearing bushing 30; pin section 27 also being enclosed by gland packing 31 and gland 32. Gland operating bolt 33 is indicated in Fig. 3. The bushing 29 is formed with a rectangular flange 34 at the outer end thereof which is adapted to seat in an annular groove formed in the stuffing box tube 35, and since the tube is fixed adjacent its outer end to the edge of an aperture formed in the U-shaped plate 5, the stuffing box bushing is held in place in tube 35 by gland 32.

Internally of bushing 29 there is formed a groove 36 which overlies an opening 37 in the pin 22. This opening is the terminus portion of an angular, outwardly extending part of a lubrication duct 38 that extends from groove 36 to a point along the bushing 30. As shown in Fig. 3, duct 38 includes an axially extending portion centrally in the pin or shaft 22. A second duct 39 extends from the terminal of duct 38 axially through the end plug 40 to a nipple 41 at which point a grease cup 42 having a compression valve 43 is attached. Internal groove 44 is formed in bushing 30 connecting with an outlet opening 45 in pin section 28. Bearing tube 46 encloses the bearing bushing 30 and is welded not only to this bushing but also to the edge of the aperture in one leg or side of the plate 5 through which the tube 46 extends. Tube 35 is similarly welded to the other leg or side of the U-shaped plate 5. It is therefore evident that the pivot 22 is formed with a central blank section to which the valve plate 21 is attached and with symmetrically positioned side bearing sections provided with lubricant from the grease cup 42 and that the entire pivot structure is located above the top edge of inlet tube 13.

Figure 2:
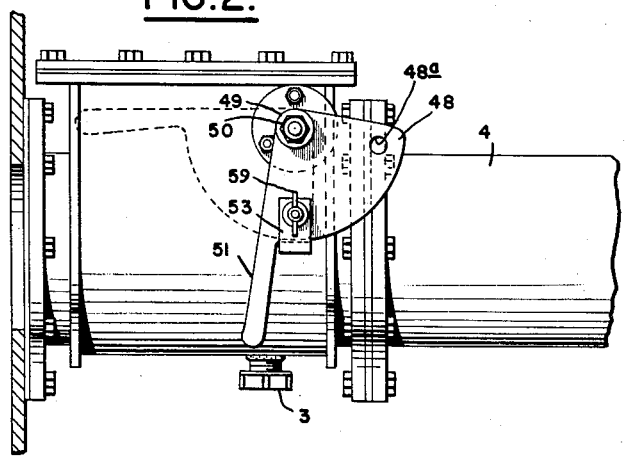
Fig. 2 is a side elevation of the valve and a section of the exhaust pipe, showing the manual locking means for the valve.

The pivot pin section 27 extends beyond the gland 32 terminates in a squared end 47 to which a quadrant plate 48 is attached, as by bosses 49 and nut 50. As shown in Fig. 2 the forward outer edge of the quadrant is radially extended to form a finger 51 suitable for manipulation of the quadrant to and fro at will. Since the quadrant is rigid with the pivot 22, movement of the quadrant causes movement of the valve plate 21, thereby bringing about opening and closing of the valve.

In order to fix the valve in different positions, there is provided a clamp 52 secured to the adjacent side of plate 5 and extending outwardly therefrom to the quadrant edge. The outer end of the clamp piece is in-turned toward the quadrant pivot to form head 53 and slotted as at 54 to receive the quadrant edge; and an aperture 55, transverse to the quadrant plane, is formed in the turned clamp head and passes through the slot 54. In this aperture 55, the bearing head 56 of a locking bolt 57 is adapted to have movement to and away from the quadrant plate. The bolt 57 lies horizontally within the clamp and has a sliding fit in retaining bushing 58 which is screw threaded into the head portion 53 of clamp 52. The bolt is equipped with a wing nut 59 secured thereon by means of pin 60. Surrounding bolt 57 is a spring 61 adapted to bear at one end against the inner edge of retaining bushing 58 and at its other end against bolt head 56. The operation of this locking means is such that the spring 61 is under compression at all times and lateral movement of bolt 57 is obtained by merely pulling outwardly on the wing nut 59. Quadrant plate 48 has an opening 48a at one end thereof which is adapted to receive bolt head 56 so that the quadrant plate and valve connected thereto can be locked in the fully open position. The valve may also assume a closed or a partially open position and is held there by the force of spring action on bolt head 56 which biases against the quadrant plate 48 to thus frictionally hold the valve in such positions. Note that the valve is not locked in its closed position, so that pressure in the duct 13 will cause it to open. Consequently, should an engine be started without the valve being first opened, the valve will automatically open.

The valve as described is normally closed when the engine is not in use and wide open when the engine is operating. In the wide open position where the valve 21 is locked in position by the bolt head 56 projecting into the opening 48a, it is observed (Fig. 1) that the valve plate is retracted into the space 15 which, because of its lateral position with reference to the main line of gas flow through connectors 13 and 11, forms a dead gas space. This reduction in gas movement is highly accentuated by the valve plate 21 which acts effectively as a baffle for deflecting gas from this space 15. As a consequence the movement of heat into space 15, due to the hot exhaust gases, is pronouncedly reduced. Thus the pivot 22 which is placed in this dead gas space is not subject to the excessive exhaust temperatures and, as a consequence, the lubricant is not charred, the bearing elements are not physically distorted, and corrosion of the pivot surfaces is avoided through sealing by the lubricant.

In periods of non-use of the engine, back wash into the engine is completely prevented by the valve in closed position, and in case of neglect to open the valve preparatory to engine use, the spring biased bolt head 56 yields to the pressure of the exhaust gases to permit the valve to open in the initial functioning of the engine. It is pointed out that the balanced pivot support in conjunction with the forced lubrication feed insures easy valve action. Also the specific pivot construction gives a completely adequate support without the use of set screws.

It should be understood that the foregoing disclosure relates only to a preferred embodiment of the invention and that modification thereof may be made without departing from the scope of the invention as set forth in the appended claims.

What is claimed is:

1. A check valve for engine exhausts subject to backwater flooding comprising a gas inlet duct having an inclined seat formed at the end thereof, an outlet duct, a pair of end plates each pierced by one of said ducts, a side member joining said end plates and forming therewith a valve chamber, a flap valve plate overlying the valve seat when in closed position, a pivot shaft extending through said side member and having bearing means mounted in said member, means attaching said valve plate to said pivot shaft, said valve plate being of such dimensions as to divert the flow of gases from the portion of said valve chamber where the bearing means is mounted when said valve is open, a quadrant plate mounted on said pivot shaft outside said valve chamber, clamp means secured to said side member and having a slotted portion therein for slidably encompassing a portion of said quadrant plate, spring-biased means mounted in said clamp means angularly related to said quadrant plate, said quadrant plate having a solid portion to be frictionally engaged by said spring-biased means, and having an aperture for receiving said spring-biased means therein for locking said plate to maintain said valve open.

2. A check valve for engine exhausts subject to backwater flooding comprising walls forming a sealed valve chamber, a gas inlet duct having an inclined seat formed at the end thereof, an outlet duct, both said ducts piercing the walls, bearings in said chamber carried by said walls, a pivot shaft journalled in said bearings and having at least one end extending therethrough one of said walls, a flap valve plate mounted on said shaft and overlying said valve seat when in closed position, a quadrant plate mounted on the extended end of said pivot shaft, clamp means secured to said walls and having yieldable means, said quadrant plate having a solid portion that is frictionally slidably engaged by said yieldable means, and having an aperture for locking engagement with said yieldable means when said valve is in an open position, said valve plate cooperating with the chamber to substantially divert the flow of gases from the portion of said valve chamber including said bearings when said valve is in open position.

3. A check valve subject to back-flow comprising wall-means defining a valve chamber having a pair of opposite openings, pipe connector members having end-portions in said openings, said valve chamber having a fluid-passage between said openings, a flap valve plate in said valve chamber, said valve chamber having a space above said fluid-passage, said space being closed on top, actuating means in said space for activating said flap valve plate from a closing position against an end of a first of said connector members to an open position in said space, said actuating means comprising a pivot shaft fixed to said flap valve plate and having spaced bearings in said wall means, and means for positively fixing said valve plate at a predetermined position with reference to said end of said first connector member, the last said means comprising an operating plate attached to said pivot shaft, clamp means secured to the wall-means exterior of said valve chamber and having a slotted element for slidable coaction with said operating plate, a spring biased friction element slidably mounted in said clamp means at an angle to said plate, whereby at will the valve may be placed in closed or open position, said operating plate having an opening adjacent to one end thereof for slidable insertion therein of said spring biased friction element to thereby lock said valve plate in the open position.

4. The combination according to claim 3 wherein said double bearing pivot shaft comprises an elongated pivot structure including centrally fixed means for holding said valve plate, and comprises pivotally movable end sections in said bearings, and a single lubricating means coupled to said pivot shaft for transmitting lubricant to each of said end sections.

5. A check valve subject to back-flow comprising a gas inlet duct having an inclined seat at one end thereof, an outlet duct, a pair of flat end plates each having an opening receiving one of said ducts, a U-shaped main plate adjoining said end plates, the upper edges of said plates defining a polygonal opening, a polygonal frame fitting said opening and forming a flange therefor, removable closure means comprising a top member engaging said frame and covering said opening, said plates and top member forming a valve chamber having a fluid-passage between said ducts and a space thereabove, a flap valve plate overlying said valve seat when in closed position, actuating means for said valve plate comprising a pivot shaft in said space and extending through one side only of said main plate and means attaching said valve plate to said pivot shaft, a pair of separate bearing housings with bearings in said space and carried by said main plate on opposite sides thereof, said bearings supporting said pivot shaft therebetween, said space being of a size to receive said valve plate in open position, said pivot shaft having an end portion in a first of said bearings and having an axially extending hole from said end portion to the second of said bearings, said hole having an angular portion opening into the said second bearing, and lubricating means solely at said first bearing for applying lubrication to said first bearing and to said hole, said first bearing being on the side of said main plate opposite to said actuating means.

References Cited in the file of this patent

UNITED STATES PATENTS

| | | |
|---|---|---|
| 660,400 | Smith | Oct. 23, 1900 |
| 787,565 | Coryell | Apr. 18, 1905 |
| 881,544 | Callan | Mar. 10, 1908 |
| 1,156,326 | Stiers | Oct. 12, 1915 |
| 1,516,000 | Clark | Nov. 18, 1924 |
| 1,935,329 | Needham | Nov. 14, 1933 |
| 2,246,802 | Kehm | June 24, 1941 |
| 2,363,943 | Carlson | Nov. 28, 1944 |